United States Patent
Oelbrandt et al.

(10) Patent No.: US 11,744,314 B2
(45) Date of Patent: Sep. 5, 2023

(54) METHOD FOR PRODUCING CONFORMAL VISOR WITH INTEGRATED OPHTHALMIC LENSES AND CORRESPONDING VISOR

(71) Applicant: META PLATFORMS TECHNOLOGIES, LLC, Menlo Park, CA (US)

(72) Inventors: Leo Oelbrandt, Kruibeke (BE); Juan Carlos Dürsteler, Castelldefels (ES)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 698 days.

(21) Appl. No.: 16/644,670

(22) PCT Filed: Sep. 5, 2018

(86) PCT No.: PCT/EP2018/073907
§ 371 (c)(1),
(2) Date: Mar. 5, 2020

(87) PCT Pub. No.: WO2019/048501
PCT Pub. Date: Mar. 14, 2019

(65) Prior Publication Data
US 2020/0375298 A1    Dec. 3, 2020

(30) Foreign Application Priority Data
Sep. 6, 2017   (EP) .................... 17189720

(51) Int. Cl.
*A42B 3/22* (2006.01)
*B33Y 80/00* (2015.01)
(Continued)

(52) U.S. Cl.
CPC ........ *A42B 3/225* (2013.01); *B29D 11/00432* (2013.01); *B33Y 80/00* (2014.12);
(Continued)

(58) Field of Classification Search
CPC ..... A42B 3/225; A42B 3/22; B29D 11/00432; B29D 11/00009; B33Y 80/00; B33Y 50/02; B29C 64/112; B29L 2011/0016
See application file for complete search history.

(56) References Cited

U.S. PATENT DOCUMENTS

| 2014/0259321 A1 | 9/2014 | Arnold |
| 2015/0061166 A1* | 3/2015 | Van De Vrie ........ G02C 13/003 264/1.7 |

(Continued)

FOREIGN PATENT DOCUMENTS

| DE | 102009004380 A1 * | 7/2010 | ............. B29D 12/02 |
| DE | 102013020874 A1 | 6/2015 | |

(Continued)

OTHER PUBLICATIONS

Machine translation of DE-102009004380-A1 (Year: 2010).*

(Continued)

Primary Examiner — Leith S Shafi
(74) Attorney, Agent, or Firm — MILLBURN IP PLLC

(57) ABSTRACT

The present invention refers to methods for producing a conformal visor (1b) with at least one integrated ophthalmic lens (2, 2a, 2b), wherein the at least one ophthalmic lens (2, 2a, 2b) is built up on the planar visor (1a) from layers of printing ink in an additive manufacturing scheme, wherein the layers are obtained through a targeted placement of droplets of printing ink at least partially side by side. The present invention further relates to a corresponding conformal visor (1b) with at least one integrated ophthalmic lens (2, 2a, 2b).

7 Claims, 1 Drawing Sheet

(51) Int. Cl.
*B29D 11/00* (2006.01)
*B29C 64/112* (2017.01)
*B33Y 50/02* (2015.01)
*B29L 11/00* (2006.01)

(52) U.S. Cl.
CPC ..... *B29C 64/112* (2017.08); *B29L 2011/0016* (2013.01); *B33Y 50/02* (2014.12)

(56) References Cited

U.S. PATENT DOCUMENTS

| | | | |
|---|---|---|---|
| 2015/0153589 A1* | 6/2015 | Meschenmoser | G02B 1/041 |
| | | | 351/159.48 |
| 2016/0152833 A1 | 6/2016 | Kostromine et al. | |
| 2017/0082872 A1 | 3/2017 | Berthelot et al. | |
| 2018/0095450 A1* | 4/2018 | Lappas | B22F 10/80 |
| 2019/0337230 A1* | 11/2019 | Kauffmann | B29D 12/02 |

FOREIGN PATENT DOCUMENTS

| | | |
|---|---|---|
| EP | 2878989 A1 | 6/2015 |
| WO | 2015/014380 A1 | 2/2015 |

OTHER PUBLICATIONS

Make Anything. Jan. 31, 2017. Custom Glasses for Ian Wright. YouTube. https://www.youtube.com/watch?v=pcfifMQxCnk (Year: 2017).*

International Search Report and Written Opinion for International Application PCT/EP2018/073907, dated May 12, 2018.

* cited by examiner

METHOD FOR PRODUCING CONFORMAL VISOR WITH INTEGRATED OPHTHALMIC LENSES AND CORRESPONDING VISOR

BACKGROUND

The present invention relates to a method for producing a conformal visor with at least one ophthalmic lens and the corresponding conformal visor.

In current technology, optical surfaces are incorporated in conformal (wrap-around) visors by mounting the prescribed ophthalmic lenses as inserts into specially designed spectacle frames. This approach, apart from requiring multiple parts and process steps, is expensive and intrusive to the user. Also, conventionally manufacturing the inserted ophthalmic lenses e.g. from lens blanks through machining, results in limitations on the positioning and sizing of the optical surfaces of the conformal visor. Hence, a true optimization and customization of the conformal visor and its optical surfaces depending on usage and user/wearer requirements and preferences is hardly possible. Moreover, the ophthalmic lens is typically thicker than the visor itself, which, in combination with the spectacle frame, results in a comparably bulky and uncomfortable conformal visor.

SUMMARY

It is therefore a purpose of the present invention to provide a method for producing a conformal visor with at least one integrated ophthalmic lens, giving the design of the conformal visor and the design of its optical surface defined by the at least one ophthalmic lens maximal flexibility while at the same time simplifying production.

This object is accomplished according to the present invention by a method for producing a conformal visor with at least one integrated ophthalmic lens, comprising the following steps: providing a planar visor in a visor-providing step, printing at least one ophthalmic lens on the planar visor during a lens-integration step, deforming the planar visor comprising the at least one ophthalmic lens into a conformal visor in a deformation step, wherein, during the lens-integration step, the at least one ophthalmic lens is built up on the planar visor from layers of printing ink in an additive manufacturing scheme, wherein the layers are obtained through a targeted placement of droplets of printing ink at least partially side by side.

Herewith a method is provided that overcomes the disadvantages associated with conventional lens manufacturing methods such as obtaining ophthalmic lenses through a machining of pre-fabricated lens blanks and mounting them into special spectacle frames of the visor. In contrast, the present method allows printing the at least one ophthalmic lens directly onto the visor in its still planar state. The visor thus serves as functional substrate for the print of the at least one ophthalmic lens. After adhesion of the printed lens to the planar visor, the visor can be deformed to obtain its desired shape. A planar visor with at least one integrated ophthalmic lens can thus be advantageously provided efficiently in a single process step and without the need for additional parts such as frames. Moreover, the shape of the at least one ophthalmic lens is not limited. Nearly any shape and distribution of optical properties such as optical power can be achieved through the additive manufacturing scheme.

Another object of the present invention is a method for producing a conformal visor with at least one integrated ophthalmic lens, comprising the following steps: printing a planar visor comprising at least one integrated ophthalmic lens during a printing step, deforming the planar visor comprising the at least one ophthalmic lens into a conformal visor in a deformation step, wherein, during the printing step, the planar visor and the at least one ophthalmic lens are built up from layers of printing ink in an additive manufacturing scheme, wherein the layers are obtained through a targeted placement of droplets of printing ink at least partially side by side.

Hence, in addition to the advantages of the previous method, a further simplification is achieved as the planar visor and the at least one ophthalmic lens are both printed in a single process step using the same setup. Design flexibility and customization options are advantageously maximized through the additive manufacturing of both, the planar visor as well as the at least one ophthalmic lens.

In the sense of the present invention, printing a three-dimensional optical structure such as an ophthalmic lens or a visor is carried out by depositing droplets of printing ink side by side and one above the other in several consecutive depositing steps by means of a print head, wherein in each depositing step a plurality of droplets is ejected simultaneously by a plurality of ejection nozzles of the print head. The three-dimensional structure is thus build up layer by layer through a targeted placement of droplets of printing ink. As known from the prior art, the deposited droplets are at least partly cured after each depositing step in a curing step. The printing ink of the deposited droplets is either fully cured after each depositing step or only partly cured. It is a known technique from the prior art, see WO2013/167528 A1, to let a time interval elapse between the deposition of the droplets and their curing. This allows the droplets to flow under the influence of gravitation in a direction tangent to the surface of the layer just printed, resulting in a particularly smooth surface. Preferably, the printing ink comprises an UV-curable liquid monomer becoming a polymer if being cured. The printing ink preferably comprises transparent or translucent printing ink.

In the sense of the present invention, the at least one ophthalmic lens comprises spherical lenses, aspheric lenses, toric lenses, atoric lenses, gradient index lenses, lenses with integrated slab-offs or incorporated prismatic corrections. In particular, the at least one ophthalmic lens comprises single vision, multifocal and progressive lenses. Preferably, the conformal visor comprises two ophthalmic lenses. In a preferred embodiment of the present invention the at least one ophthalmic lens is split into two or more entities per eye, i.e. the at least one ophthalmic lens is disconnected and not a single, connected entity. Hence, different optical functions and properties can be split spatially. The size, shape and position of the at least one ophthalmic lens can be highly customized.

In a preferred embodiment of the present invention, the planar visor comprises a formable hard coating on the side opposing the side on which the at least one ophthalmic lens is printed if the planar visor is pre-fabricated and serves as a functional substrate. This lends additional stability to the visor. Preferably, the at least one ophthalmic lens is printed on the back side of the planar visor, i.e. such that it is closer to the wearer's eyes upon wearing.

In a preferred embodiment of the present invention, a first printing ink is used for printing the at least one ophthalmic lens and a second printing ink is used for printing the planar visor, if the planar visor is not pre-fabricated. This allows to choose a printing ink that is optimally fit for its purpose for the print of each respective structure. Preferably, the first and the second printing ink are matched according to their draw ratio.

In a preferred embodiment of the present invention, the printed initial planar shape of the at least one ophthalmic lens is determined taking into account the final conformal shape obtained through deformation in the deformation step. In a preferred embodiment of the present invention, the initial, i.e. planar, shape of the at least one ophthalmic lens is calculated under the constraint that the desired optical properties are obtained after deformation, e.g. forming or bending, of the visor in the deformation step.

In a preferred embodiment of the present invention, the planar visor comprising at least one integrated ophthalmic lens is made conformal through uniaxial deformation, e.g. forming or bending, preferably along an axis that upon wearing the visor is parallel to the longitudinal axis of the wearer, during the deformation step. Preferably, the conformity of the visor comprising at least one integrated ophthalmic lens is customized, i.e. determined depending on the facial profile of the wearer.

Alternatively or additionally, the planar visor comprising at least one integrated ophthalmic lens is biaxially deformed during the deformation step.

In a preferred embodiment of the present invention, the planar visor comprising at least one integrated ophthalmic lens is formed using thermoforming, vacuum forming or pressure forming during the deformation step.

In an alternative embodiment, the planar visor comprising at least one integrated ophthalmic lens is bent during the deformation step and fixated in this state using external tension. Advantageously, the uniaxial bending results in little or no thickness reduction of the visor and the at least one ophthalmic lens.

In a preferred embodiment of the present invention, electronic components such as displays and/or lights and/or sensors and/or transmitters and/or conductive traces are integrated into the planar visor before the deformation step. This yields additional functionality to the conformal visor. Displays comprise liquid crystal displays (LCDs), organic light-emitting diodes (OLEDs) as well as electrochromic displays. Lights preferably comprise light-emitting diodes (LEDs). Sensors preferably comprise sensors to sense light, visibility, temperature, pressure, humidity and acceleration. Transmitters preferably comprise integrated circuits (ICS) to transmit sensed data to e.g. an external device.

In a preferred embodiment, a customization step is carried out prior to the printing step or visor-providing step, respectively, during which the visor and/or the at least one ophthalmic lens are customized with respect to their geometries, curvatures, the type of integrated functionality as well as the location of the at least one ophthalmic lens on the visor depending on purpose and/or wearer.

Another object of the present invention is a conformal visor comprising at least one integrated ophthalmic lens produced by a method according to one of the claims 1 to 12. The conformal visor obtained in this way inherits the advantages of its production method described above. In particular, the conformal visor is lighter and less bulky as compared to those manufactured by methods known from the prior art. Moreover, due to the flexibility of the underlying additive manufacturing scheme used at least for the addition of the at least one ophthalmic lens, a highly customizable conformal visor with optical properties is provided. Customization does not only include a better adaptation to a specific user/wearer, but also a better adaptation and optimization with respect to its purpose. Advantageously, a conformal visor with at least one integrated ophthalmic lens is hence provided whose design can respond to its purpose to a much larger degree than conventionally manufactured conformal visors. Limitations associated with the conventional manufacturing methods are overcome.

In a preferred embodiment, the conformal visor comprises a filter that reduces the transmission of light and/or serves as a polarization filter.

In a preferred embodiment, the conformal visor comprises at least one switchable liquid crystal through which the transmission of the visor and/or the refractive index of optically active areas, in particular the at least one integrated ophthalmic lens, can be controlled electronically.

DETAILED DESCRIPTION

Figure 1:
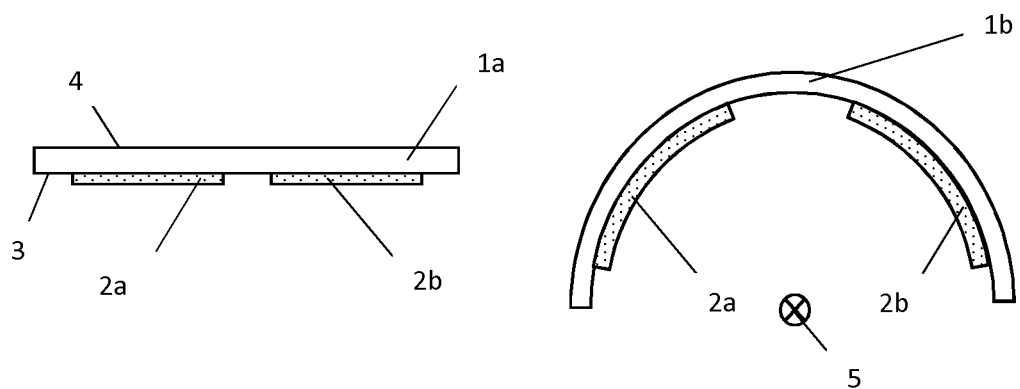
FIG. 1 schematically illustrates a method according to an exemplary embodiment of the present invention.

The present invention will be described with respect to particular embodiments and with target to certain drawings but the invention is not limited thereto but only by the claims. The drawings described are only schematic and are non-limiting. In the drawings, the size of some of the elements may be exaggerated and for illustrative purposes may not be drawn to scale.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1 a method for producing a conformal visor 1b with at least one integrated ophthalmic lens 2a, 2b according to an exemplary embodiment of the present invention is schematically illustrated. First, a planar visor 1a with at least one ophthalmic lens 2a, 2b is provided. In the depicted embodiment, the planar visor 1a comprises two ophthalmic lenses 2a, 2b, one for each eye. This example generalizes to other embodiments with less or more integrated ophthalmic lenses 2a, 2b.

According to a first method, the planar visor 1a with ophthalmic lenses 2a, 2b is obtained in two steps: a visor-providing step and a lens-integration step. During the visor-providing step, a pre-fabricated planar visor 1a is provided. The planar visor 1a has a back side 3 and a front side 4. Here and throughout, "front" and "back" are determined by the proximity to the wearer's face during wear of the final, conformal visor 1b. The back side 3 is the side of the visor 1a, 1b that will face the wearer's face during wear. Preferably, the visor 1a is provided inside a 3d printer. During the following lens-integration step, the at least one ophthalmic lens, here two ophthalmic lenses 2a, 2b, are printed on one side of the planar visor 1a, preferably the back side 3. Hence, the pre-fabricated planar visor 1a serves as functional substrate in the lens-integration step. Printing of the ophthalmic lenses 2a, 2b comprises additively manufacturing the ophthalmic lenses 2a, 2b through a targeted placement of droplets of printing ink at least partially side by side. The droplets of printing ink are preferably ejected by nozzles of a print head of a 3d or droplet-on-demand printer towards the planar visor 1a. Thus, the ophthalmic lenses 2a, 2b are built up from layers of printing ink. The printing ink comprises preferably a translucent or transparent printing material. Particularly preferably, the printing ink comprises a UV-polymerizable monomer. In a preferred embodiment, the printing ink is tinted to achieve a filter effect, e.g. to reduce the transmission of light or light with a defined property in at least one of the ophthalmic lenses 2a, 2b. Preferably, the deposited printing ink is cured at certain intervals. Curing may be carried out after each deposition, after deposition of a layer or at other suitable regular or irregular intervals. As is known from the prior art, curing is preferably carried out through irradiation with light, in particular UV light. The shape of the ophthalmic lenses 2a, 2b is determined according to its function. In particular, the printed shape is preferably determined taking into account the deformations that the ophthalmic lenses 2a, 2b will undergo during the deformation step. More precisely, the printed shape is preferably chosen such that the ophthalmic lenses 2a, 2b exhibit the desired optical and geometrical properties at the end of the deformation step. This includes in particular determining the thickness of the printed ophthalmic lenses 2a, 2b such that the ophthalmic lenses 2a, 2b exhibit desired prescription properties. The ophthalmic lenses 2a, 2b comprise any lens apt at correcting vision, in particular single vision, multifocal, progressive and gradient index lenses, as well as spherical, aspheric, toric, atoric lenses and lenses with slab-offs and incorporated prismatic corrections. In the embodiment displayed in FIG. 1, by way of example, two ophthalmic lenses 2a, 2b are printed on the planar visor 1a, one lens for each eye. In a preferred embodiment of the present invention, the two ophthalmic lenses 2a, 2b are printed with a first and a second printing ink, respectively. Using different printing inks for the respective lenses, different optical properties can efficiently be achieved. For example, the first and the second printing ink differ in their refractive indices.

Depending on the application and purpose of the visor 1a, 1 b, the front side of the visor 1a, 1 b may comprise a hard coating improving the stability and durability of the visor 1a, 1b.

According to a second, alternative method, the planar visor 1a with the ophthalmic lenses 2a, 2b is obtained through a single step, the printing step. This method differs from the previously described method in that the planar visor 1a is not pre-fabricated but printed as well. For the printing of the planar visor 1a, the same remarks apply as made with respect to the printing of the ophthalmic lenses 2a, 2b. The planar visor 1a is preferably printed using a transparent or translucent printing ink. The printing ink used for printing the planar visor 1a differs from the printing ink used for printing at least one of ophthalmic lenses 2a, 2b in at least one property, according to a preferred embodiment. Preferably, the two different printing inks are matched in terms of their draw ratio. In a preferred embodiment, the visor 1a and its optically active area, i.e. the ophthalmic lenses 2a, 2b are tinted to achieve filtering of light, e.g. a reduction of light transmission or polarization filtering. The ophthalmic lenses 2a, 2b are preferably printed on the back side 3 of the visor 1a, 1 b. Printing the planar visor 1a as well as the ophthalmic lenses 2a, 2b, a planar visor 1a with integrated ophthalmic lenses 2a, 2b is provided in a single process step and setup. This streamlines and simplifies the production process, but also lends maximal flexibility to the design of visor 1a and ophthalmic lenses 2a, 2b. The resulting product is a planar visor 1a with fully integrated ophthalmic lenses 2a, 2b. In a preferred embodiment, at least one electronic component is integrated in the visor 1a. This is preferably done after printing of the planar visor 1a is finished and before printing of the ophthalmic lenses 2a, 2b is carried out. In this way, additional functionality is added to the visor 1a, 1b. This includes, for example, displays, lights, conductive traces as well as sensors. Through e.g. the integration of switchable liquid crystals into the planar visor 1a, optical properties of the visor 1a, 1b or its optically active areas constituted by the ophthalmic lenses 2a, 2b can be electronically controlled. Preferably, light transmission and refractive index can be controlled in this way.

During either method, the lens-integration step and the printing step, respectively, are followed by a deformation step during which the planar visor 1a with integrated ophthalmic lenses 2a, 2b is deformed. Preferably, the visor 1a is formed to yield a conformal visor 1b, see the right side of FIG. 1. In the preferred embodiment depicted here, the planar visor 1a is made conformal by forming it uniaxially along an axis that upon wearing of the final visor 1b is parallel to the longitudinal axis 5 of the wearer. Preferably, conformity is being customizable depending on the facial profile of the wearer. In an alternative embodiment, the planar visor 1a is formed biaxially during the deformation step. During the deformation step, the planar visor 1a with integrated ophthalmic lenses 2a, 2b is formed using for example thermoforming, vacuum forming or pressure forming. Alternatively, the planar visor 1a with integrated ophthalmic lenses 2a, 2b is bent to become conformal and is fixated in this state using external tension during and after the deformation step. Once the tension is released, the visor 1b with integrated ophthalmic lenses 2a, 2b retains its original planar state. Advantageously, the uniaxial bending results in little or no thickness reduction of the visor 1a, 1b and the integrated ophthalmic lenses 2a, 2b.

In a preferred embodiment of the present invention, the initial, i.e. planar, shape of the at least one ophthalmic lens 2a, 2b is calculated under the constraint that the desired optical properties are obtained after forming of the visor 1b in the deformation step. The initial, planar shape comprises in particular the thickness of the at least one ophthalmic lens 2a, 2b. The desired optical properties comprise in particular those defined in a lens prescription. Preferably, the initial planar shape is communicated to the print head before or during the printing process through print data, e.g. in the form of CAD data and/or intensity images.

Figure 2:
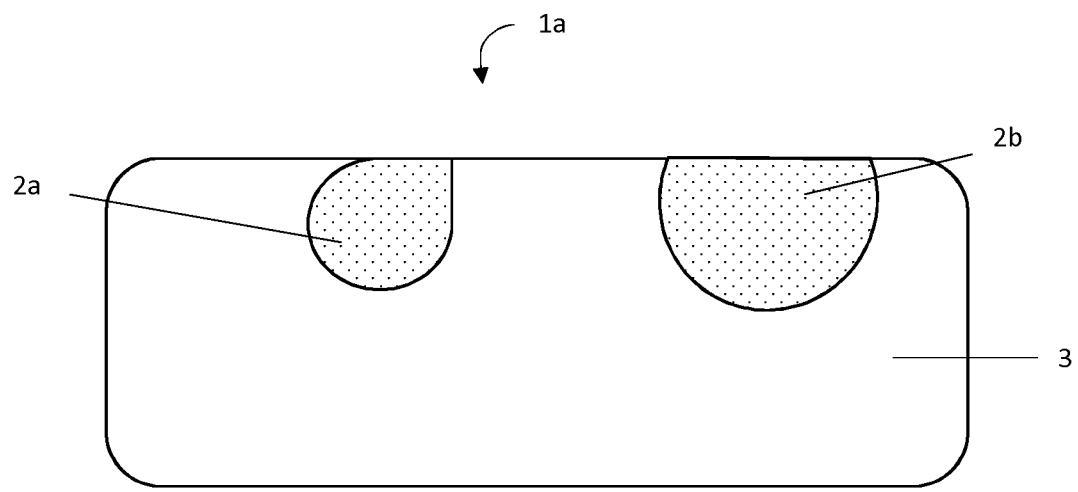
FIG. 2 schematically illustrates a conformal visor according to an exemplary embodiments of the present invention.

In a preferred embodiment, a customization step is carried out prior to the printing step or visor-providing step, respectively. Through customization, a highly specialized and optimized visor 1a can be obtained. An exemplary embodiment of the present invention in the form of such a conformal visor 1a is schematically illustrated in FIG. 2. Customization in the sense of the present invention comprises adaptations to the physical properties of a wearer as well as optimization with respect to a specific purpose. Properties that are preferably adapted depending on wearer physique and preferences, prescription data and purpose comprise the location and size of the at least one ophthalmic lens 2a, 2b, the optical properties of the at least one ophthalmic lens 2a, 2b, the geometry such as shape, thickness and curvature of the conformal visor 1b as well as additional functionality. Additional functionality is preferably lent to the conformal visor 1b with at least one integrated ophthalmic lens 2a, 2b through embedded electronic components as described above and/or functional coatings or special printing materials. E.g. the near and intermediate viewing areas defined by the at least one ophthalmic lens are preferably limited to only one side. This is particularly suitable e.g. for applications such as shooter's visors. In a preferred embodiment, the conformal visor 1*b* with integrated ophthalmic lens 2*a*, 2*b* is customized and optimized for shooting purposes. The planar visor is endowed with two ophthalmic lenses 2*a*, 2*b* according to one of the two methods described above. The location of the two ophthalmic lenses 2*a*, 2*b* is customized based on the application, namely rifle and pistol shooting. In the present exemplary embodiment, two possibilities to add near-viewing optical areas for rifle and pistol shooting are illustrated. In particular, a first ophthalmic lens 2*a* is located in the upper half of the planar visor 1*a* such that it lies in the view field of e.g. the left eye during rifle shooting. Correspondingly, a second ophthalmic lens 2*b* is located in the upper half of the planar visor 1*a* such that it lies in the view field of e.g. the right eye during pistol shooting. Optical and geometrical properties of the first and second ophthalmic lenses 2*a*, 2*b* are adapted to their respective purpose. E.g. the first ophthalmic lens 2*a* comprises a side bifocal lens of a certain size and of preferably round shape. The second ophthalmic lens 2*b* designed for pistol shooting comprises for example and inverted bifocal lens. Preferably, the second ophthalmic lens 2*b* for pistol shooting has a larger diameter than the first ophthalmic lens 2*a* for rifle shooting. It is also preferred, to print the second ophthalmic lens 2*b* on the upper edge of the visor 1*a* in order to account for the head movement of the wearer during aiming.

Figure 3:
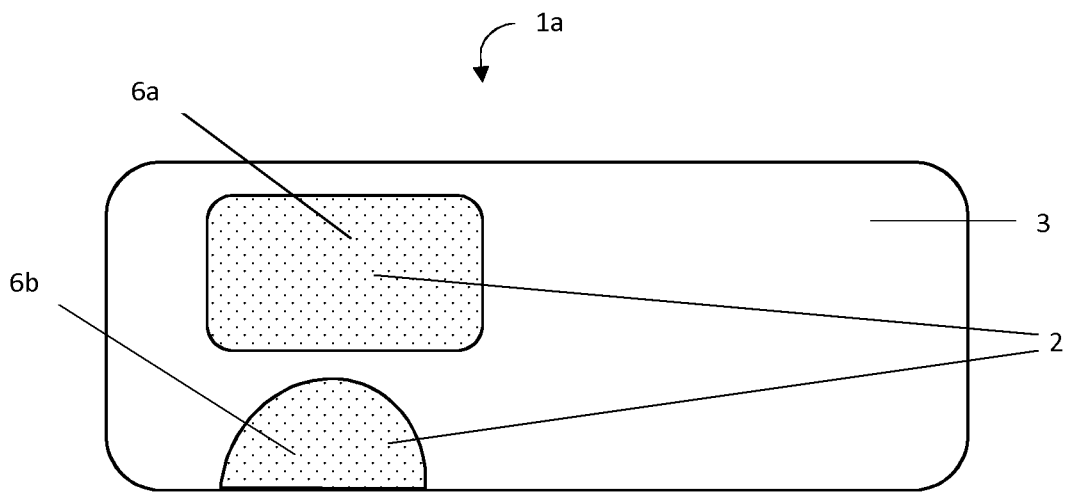
FIG. 3 schematically illustrates a conformal visor according to an alternative exemplary embodiment of the present invention.

In FIG. 3 a visor 1*a* according to an alternative exemplary embodiment of the present invention is schematically illustrated. The at least one ophthalmic lens 2 may be connected or split across the visor 1*a*, 1*b* into multiple entities. FIG. 3 illustrates an example of a visor 1*a* with one ophthalmic lens 2 split across the visor 1*a* into multiple, e.g. two, entities. In this way, it is advantageously possible to spatially separate zones with different optical properties. For example, the at least one ophthalmic lens 2 is split into a first zone 6*a* and a second zone 6*b*. The first and second zone 6*a*, 6*b* are spatially separated and differ in at least one optical property. Different optical properties result, for example, from the use of different printing inks for the multiple entities, e.g. the first zone 6*a* is printed with a first printing ink and the second zone 6*b* is printed with a second printing ink, where the first and the second printing differ in at least one property. Preferably, the first and the second printing ink have different refractive indices. In this way, the first zone 6*a* is designed and printed for distance viewing and the second zone 6*b* is designed and printed for near viewing. Preferably, the first zone 6*a* is located in the upper half of the visor 1*a* and the second zone 6*b* is located in the lower half of the visor 1*a*. Advantageously, the inventive method lends full flexibility not only the position of the different zones 6*a*, 6*b* on the visor 1*a*, but also to the size and shape of the zones 6*a*, 6*b*. As the at least one ophthalmic lens 2 is printed through a three-dimensional printing scheme, location, size and shape can be freely chosen and also varied from visor to visor. Preferably, the distance-viewing zone 6*a* has a mainly rectangular shape and covers a comparatively large section of the view field of the corresponding eye, whereas the near-viewing zone 6*b* is of circular shape and covers a comparatively small section of the lower view field of the same eye. Hence, the presented method allows the efficient and flexible production of highly customized conformal visors 1*b*, e.g. through the integration of split lenses 2.

KEY TO FIGURES

1*a* Visor prior to deformation step
1*b* Visor after deformation step
2 Ophthalmic lens
2*a* Ophthalmic lens
2*b* Ophthalmic lens
3 Visor back side
4 Visor front side
5 Longitudinal axis
6*a* First zone
6*b* Second zone

The invention claimed is:

1. A method for producing a conformal visor with at least one integrated ophthalmic lens through three-dimensional printing, the method comprising:
   printing a planar visor based on a first printing ink;
   printing at least one ophthalmic lens on the planar visor based on a second ink; and
   bending the planar visor and the at least one ophthalmic lens into a curved shape to form the conformal visor.

2. The method according to claim 1, wherein a printed, planar shape of the at least one ophthalmic lens is determined taking into account a final, conformal shape of the at least one ophthalmic lens obtained through bending.

3. The method according to claim 1, wherein the planar visor comprising the at least one integrated ophthalmic lens is made conformal through uniaxial bending, along an axis that upon wearing the visor is parallel to a longitudinal axis of the wearer.

4. The method according to claim 1, wherein the planar visor comprising the at least one integrated ophthalmic lens is biaxially bent.

5. The method according to claim 1, wherein after the planar visor comprising the at least one integrated ophthalmic lens is bent, the visor in the bent state is fixated using external tension.

6. The method according to claim 1, wherein printing the at least one ophthalmic lens comprises:
   printing a first lens at a first zone and a second lens at a second zone on the planar visor using different printing inks, wherein the first zone and the second zone on the planar visor are spatially separated.

7. The method according to claim 1, further comprising:
   prior to printing the at least one ophthalmic lens, disposing an electronic component on the planar visor,
   wherein printing the at least one ophthalmic lens comprises printing the at least one ophthalmic lens on the planar visor and the electronic component, and
   wherein bending the planar visor comprises bending the planar visor comprising the electronic component and bending the at least one ophthalmic lens into the curved shape to form the conformal visor.

\* \* \* \* \*